United States Patent
Paul et al.

(10) Patent No.: US 9,808,769 B2
(45) Date of Patent: Nov. 7, 2017

(54) COMPOSITE POLYAMIDE MEMBRANE POST TREATED WITH NITROUS ACID

(71) Applicant: Dow Global Technologies LLC, Midland, MI (US)

(72) Inventors: Mou Paul, Edina, MN (US); Abhishek Roy, Edina, MN (US); Ian A. Tomlinson, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 13 days.

(21) Appl. No.: 15/030,919

(22) PCT Filed: Oct. 29, 2014

(86) PCT No.: PCT/US2014/062830
§ 371 (c)(1),
(2) Date: Apr. 21, 2016

(87) PCT Pub. No.: WO2015/084511
PCT Pub. Date: Jun. 11, 2015

(65) Prior Publication Data
US 2016/0271567 A1  Sep. 22, 2016

Related U.S. Application Data

(60) Provisional application No. 61/910,559, filed on Dec. 2, 2013.

(51) Int. Cl.
| | | |
|---|---|---|
| B01D 67/00 | (2006.01) |
| B01D 69/12 | (2006.01) |
| B01D 71/56 | (2006.01) |
| B05D 3/10 | (2006.01) |

(52) U.S. Cl.
CPC ..... *B01D 67/0093* (2013.01); *B01D 67/0006* (2013.01); *B01D 69/125* (2013.01); *B01D 71/56* (2013.01); *B05D 3/108* (2013.01); *B01D 2323/40* (2013.01); *B01D 2325/20* (2013.01)

(58) Field of Classification Search
None
See application file for complete search history.

(56) References Cited

U.S. PATENT DOCUMENTS

| | | |
|---|---|---|
| 3,304,310 A | 2/1967 | Hari et al. |
| 3,686,116 A | 8/1972 | Rio |
| 3,694,390 A | 9/1972 | Winslow |
| 3,878,109 A | 4/1975 | Ikeda et al. |
| 4,259,183 A | 3/1981 | Cadotte |
| 4,265,745 A | 5/1981 | Kawaguchi et al. |
| 4,277,344 A | 7/1981 | Cadotte |
| 4,529,646 A | 7/1985 | Sundet |
| 4,606,943 A | 8/1986 | Rak et al. |
| 4,626,468 A | 12/1986 | Sundet |
| 4,643,829 A | 2/1987 | Sundet |
| 4,719,062 A | 1/1988 | Sundet |
| 4,758,343 A | 7/1988 | Sasaki et al. |
| 4,761,234 A | 8/1988 | Uemura et al. |
| 4,769,148 A | 9/1988 | Fibiger et al. |
| 4,783,346 A | 11/1988 | Sundet |
| 4,812,270 A | 3/1989 | Cadotte et al. |
| 4,830,885 A | 5/1989 | Tran et al. |
| 4,872,984 A | 10/1989 | Tomaschke |

(Continued)

FOREIGN PATENT DOCUMENTS

| | | |
|---|---|---|
| CN | 1035338 | 9/1989 |
| CN | 1935338 | 3/2007 |

(Continued)

OTHER PUBLICATIONS

Li et al, Polyamide Thin Film Composite Membranes Prepared from Isomeric Biphenyl Tetraacyl Chloride and m-phenylenediamine, Journal of Membrane Science, 315, (2008) 20-27.

(Continued)

*Primary Examiner* — Erma Cameron
(74) *Attorney, Agent, or Firm* — Edward W. Black

(57) ABSTRACT

A method for making a composite polyamide membrane including a porous support and a thin film polyamide layer, wherein the method includes: (i) applying a polar solution comprising a polyfunctional amine monomer and a non-polar solution comprising a polyfunctional acyl halide monomer to a surface of a porous support and interfacially polymerizing the monomers to form a thin film polyamide layer; (ii) treating the thin film polyamide layer with a polyfunctional arene compound; and (iii) exposing the thin film polyamide layer to nitrous acid; wherein the polar and non-polar solutions further comprises at least one of the following: (A) at least one of the solutions further comprises a tri-hydrocarbyl phosphate compound represented by Formula (I): and (B) the non-polar solution further comprises an acid-containing monomer comprising a $C_2$-$C_{20}$ hydrocarbon moiety substituted with at least one carboxylic acid functional group or salt thereof and at least one amine-reactive functional group.

(I)

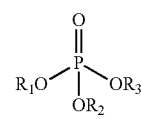

9 Claims, No Drawings

(56) References Cited

U.S. PATENT DOCUMENTS

| | | | |
|---|---|---|---|
| 4,888,116 A | 12/1989 | Cadotte et al. | |
| 4,948,507 A | 8/1990 | Tomaschke | |
| 4,950,404 A | 8/1990 | Chau | |
| 4,960,517 A | 10/1990 | Cadotte | |
| 5,015,380 A | 5/1991 | Sundet | |
| 5,015,382 A | 5/1991 | Sundet | |
| 5,019,264 A | 5/1991 | Arthur | |
| 5,024,765 A * | 6/1991 | Linder | B01D 67/0093 210/490 |
| 5,032,282 A * | 7/1991 | Linder | B01D 67/0093 210/490 |
| 5,049,282 A | 9/1991 | Linder et al. | |
| 5,051,178 A | 9/1991 | Uemura et al. | |
| 5,160,619 A | 11/1992 | Yamaguchi et al. | |
| 5,180,802 A | 1/1993 | Hartman et al. | |
| 5,246,587 A | 9/1993 | Tomaschke | |
| 5,254,261 A | 10/1993 | Tomaschke et al. | |
| 5,290,452 A | 3/1994 | Schucker | |
| 5,336,409 A | 8/1994 | Hachisuka et al. | |
| 5,510,527 A | 4/1996 | Hachisuka et al. | |
| 5,576,057 A | 11/1996 | Hirose et al. | |
| 5,582,725 A | 12/1996 | McCray et al. | |
| 5,593,588 A | 1/1997 | Kim et al. | |
| 5,614,099 A | 3/1997 | Hirose et al. | |
| 5,616,249 A | 4/1997 | Hodgdon | |
| 5,693,227 A | 12/1997 | Costa | |
| 5,733,602 A | 3/1998 | Hirose et al. | |
| 5,744,039 A | 4/1998 | Itoh et al. | |
| 5,783,079 A | 7/1998 | Kumano et al. | |
| 5,843,351 A | 12/1998 | Hirose et al. | |
| 5,876,602 A | 3/1999 | Jons et al. | |
| 5,989,426 A | 11/1999 | Hirose et al. | |
| 6,024,873 A | 2/2000 | Hirose et al. | |
| 6,086,764 A | 7/2000 | Linder et al. | |
| 6,162,358 A | 12/2000 | Li et al. | |
| 6,245,234 B1 | 6/2001 | Koo et al. | |
| 6,280,853 B1 | 8/2001 | Mickols | |
| 6,337,018 B1 | 1/2002 | Mickols | |
| 6,406,626 B1 | 6/2002 | Murakami et al. | |
| 6,464,873 B1 | 10/2002 | Tomaschke | |
| 6,521,130 B1 | 2/2003 | Kono et al. | |
| 6,562,266 B2 | 5/2003 | Mickols | |
| 6,723,241 B2 | 4/2004 | Mickols | |
| 6,723,422 B1 | 4/2004 | Hirose et al. | |
| 6,777,488 B1 | 8/2004 | Araki et al. | |
| 6,878,278 B2 | 4/2005 | Mickols | |
| 7,279,097 B2 | 10/2007 | Tomioka et al. | |
| 7,806,275 B2 | 10/2010 | Murphy et al. | |
| 7,815,987 B2 | 10/2010 | Mickols et al. | |
| 8,147,735 B2 | 4/2012 | Buschmann | |
| 8,177,978 B2 | 5/2012 | Kurth et al. | |
| 8,567,612 B2 | 10/2013 | Kurth et al. | |
| 8,603,340 B2 | 12/2013 | Kurth et al. | |
| 8,968,828 B2 | 3/2015 | Roy et al. | |
| 8,999,449 B2 | 4/2015 | Paul et al. | |
| 9,073,015 B2 | 7/2015 | Rosenburg et al. | |
| 2008/0185332 A1 | 8/2008 | Niu et al. | |
| 2009/0071903 A1 | 3/2009 | Nakatsuji et al. | |
| 2009/0107922 A1 | 4/2009 | Zhang et al. | |
| 2009/0220690 A1 | 9/2009 | Niu et al. | |
| 2009/0272692 A1 | 11/2009 | Kurth et al. | |
| 2010/0062156 A1 | 3/2010 | Kurth et al. | |
| 2011/0005997 A1 | 1/2011 | Kurth et al. | |
| 2011/0049055 A1 | 3/2011 | Wang et al. | |
| 2011/0189469 A1* | 8/2011 | Stenzel | B01D 69/125 428/315.5 |
| 2012/0003387 A1 | 1/2012 | Kim et al. | |
| 2012/0080058 A1 | 4/2012 | Isaias et al. | |
| 2012/0248027 A1 | 10/2012 | Sasaki et al. | |
| 2012/0261332 A1 | 10/2012 | Takagi et al. | |
| 2012/0261344 A1 | 10/2012 | Kurth et al. | |
| 2012/0305473 A1 | 12/2012 | Ogawa et al. | |
| 2013/0089727 A1 | 4/2013 | Nilsen et al. | |
| 2013/0126419 A1 | 5/2013 | Ogawa et al. | |
| 2013/0256215 A1 | 10/2013 | Nakatsuji et al. | |
| 2013/0287944 A1 | 10/2013 | Paul et al. | |
| 2013/0287946 A1 | 10/2013 | Jons et al. | |
| 2014/0170314 A1 | 6/2014 | Zhang et al. | |
| 2014/0199483 A1 | 7/2014 | Roy et al. | |
| 2014/0206900 A1 | 7/2014 | Qiu et al. | |
| 2014/0231338 A1 | 8/2014 | Takaya et al. | |
| 2014/0264161 A1 | 9/2014 | Roy et al. | |
| 2014/0264162 A1 | 9/2014 | Qiu et al. | |
| 2014/0272134 A1 | 9/2014 | Roy et al. | |
| 2014/0370191 A1 | 12/2014 | Rosenberg et al. | |
| 2015/0129485 A1 | 5/2015 | Roy et al. | |
| 2015/0147470 A1 | 5/2015 | Arrowood et al. | |
| 2015/0151255 A1 | 6/2015 | Roy et al. | |
| 2015/0157990 A1 | 6/2015 | Roy et al. | |
| 2015/0165387 A1 | 6/2015 | Roy et al. | |
| 2015/0174534 A1 | 6/2015 | Paul et al. | |
| 2015/0298066 A1 | 10/2015 | Roy et al. | |
| 2015/0306548 A1 | 10/2015 | Roy et al. | |
| 2015/0314243 A1 | 11/2015 | Roy et al. | |

FOREIGN PATENT DOCUMENTS

| | | |
|---|---|---|
| CN | 102219673 | 10/2011 |
| EP | 556569 | 11/1993 |
| WO | 2013048762 | 4/2013 |
| WO | 2013048763 | 4/2013 |
| WO | 2013048765 | 4/2013 |
| WO | 2015084512 | 6/2015 |
| WO | 2015105630 | 7/2015 |
| WO | 2015105631 | 7/2015 |
| WO | 2015105632 | 7/2015 |
| WO | 2015105636 | 7/2015 |
| WO | 2015105637 | 7/2015 |
| WO | 2015105638 | 7/2015 |
| WO | 2015105639 | 7/2015 |
| WO | 2015175254 | 11/2015 |
| WO | 2015175256 | 11/2015 |

OTHER PUBLICATIONS

Petersen, Composite Reverse Osmosis and Nanofiltration Membranes, Journal of Membrane Science, 83, (1993) 81-150.

* cited by examiner

COMPOSITE POLYAMIDE MEMBRANE POST TREATED WITH NITROUS ACID

FIELD

The present invention is generally directed toward composite polyamide membranes along with methods for making and using the same.

INTRODUCTION

Composite polyamide membranes are used in a variety of fluid separations. One common class of membranes includes a porous support coated with a "thin film" polyamide layer. The thin film layer may be formed by an interfacial polycondensation reaction between polyfunctional amine (e.g. m-phenylenediamine) and polyfunctional acyl halide (e.g. trimesoyl chloride) monomers which are sequentially coated upon the support from immiscible solutions, see for example U.S. Pat. No. 4,277,344 to Cadotte. Various constituents may be added to one or both of the coating solutions to improve membrane performance. For example, U.S. Pat. No. 4,259,183 to Cadotte describes the use of combinations of bi- and tri-functional acyl halide monomers, e.g. isophthaloyl chloride or terephthaloyl chloride with trimesoyl chloride. WO2012/102942, WO2012/102943, WO2012/102944, WO2013/048765 and WO2013/103666 describe the addition of various monomers including carboxylic acid and amine-reactive functional groups in combination with a tri-hydrocarbyl phosphate compound as described in U.S. Pat. No. 6,878,278 to Mickols. US 2011/0049055 describes the addition of moieties derived from sulfonyl, sulfinyl, sulfenyl, sulfuryl, phosphoryl, phosphonyl, phosphinyl, thiophosphoryl, thiophosphonyl and carbonyl halides. US 2009/0272692, US 2012/0261344 and U.S. Pat. No. 8,177,978 describe the use of various polyfunctional acyl halides and their corresponding partially hydrolyzed counterparts. U.S. Pat. No. 4,812,270 and U.S. Pat. No. 4,888,116 to Cadotte (see also WO 2013/047398, US2013/0256215, US2013/0126419, US2012/0305473, US2012/0261332 and US2012/0248027) describe post-treating the membrane with phosphoric or nitrous acid. The search continues for new combinations of monomers, additives and post-treatments that improve membrane performance.

SUMMARY

The invention includes a method for making a composite polyamide membrane including a porous support and a thin film polyamide layer. The method includes the steps of:
  i) applying a polar solution comprising a polyfunctional amine monomer and a non-polar solution comprising a polyfunctional acyl halide monomer to a surface of a porous support and interfacially polymerizing the monomers to form a thin film polyamide layer;
  ii) treating the thin film polyamide layer with a polyfunctional arene compound comprising 1 or 2 benzene rings collectively substituted with the follow four functional groups:
    (a) a first functional group (w) selected from: —NR$_4$R$_5$ and —OH,
    (b) a second functional group (x) selected from: —NR$_4$R$_5$, —OH, —COOH, and —SO$_3$H,
    (c) a third functional group (y) is selected from: —H, —NR$_4$R$_5$, —OH, —COOH, and —SO$_3$H,
    (d) a fourth functional group (z) selected from: —H, —CH$_3$, —NR$_4$R$_5$, —OH, —COOH and —SO$_3$H,
    wherein: (R$_4$) and (R$_5$) are independently selected from: —H and hydrocarbyl groups comprising from 1 to 10 carbon atoms; and
  iii) exposing the thin film polyamide layer to nitrous acid; wherein the polar and non-polar solutions further comprises at least one of the following:
    (A) at least one of the solutions further comprises a tri-hydrocarbyl phosphate compound represented by Formula I:

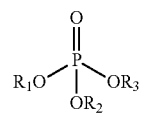

wherein R$_1$, R$_2$ and R$_3$ are independently selected from hydrogen and hydrocarbyl groups comprising from 1 to 10 carbon atoms, with the proviso that no more than one of R$_1$, R$_2$ and R$_3$ are hydrogen; and
    (B) the non-polar solution further comprises an acid-containing monomer comprising a C$_2$-C$_{20}$ hydrocarbon moiety substituted with at least one carboxylic acid functional group or salt thereof and at least one amine-reactive functional group selected from: acyl halide, sulfonyl halide and anhydride, wherein the acid-containing monomer is distinct from the polyfunctional acyl halide monomer.

Many additional embodiments are described including applications for such membranes.

DETAILED DESCRIPTION

The invention is not particularly limited to a specific type, construction or shape of composite membrane or application. For example, the present invention is applicable to flat sheet, tubular and hollow fiber polyamide membranes useful in a variety of applications including forward osmosis (FO), reverse osmosis (RO), nano filtration (NF), ultra filtration (UF), micro filtration (MF) and pressure retarded fluid separations. However, the invention is particularly useful for membranes designed for RO and NF separations. RO composite membranes are relatively impermeable to virtually all dissolved salts and typically reject more than about 95% of salts having monovalent ions such as sodium chloride. RO composite membranes also typically reject more than about 95% of inorganic molecules as well as organic molecules with molecular weights greater than approximately 100 Daltons. NF composite membranes are more permeable than RO composite membranes and typically reject less than about 95% of salts having monovalent ions while rejecting more than about 50% (and often more than 90%) of salts having divalent ions—depending upon the species of divalent ion. NF composite membranes also typically reject particles in the nanometer range as well as organic molecules having molecular weights greater than approximately 200 to 500 AMU (Daltons).

Examples of composite polyamide membranes include FilmTec Corporation FT-30™ type membranes, i.e. a flat sheet composite membrane comprising a bottom layer (back side) of a nonwoven backing web (e.g. PET scrim), a middle layer of a porous support having a typical thickness of about 25-125 μm and top layer (front side) comprising a thin film polyamide layer having a thickness typically less than about 1 micron, e.g. from 0.01 to 0.1 µm. The porous support is typically a polymeric material having pore sizes which are of sufficient size to permit essentially unrestricted passage of permeate but not large enough so as to interfere with the bridging over of a thin film polyamide layer formed thereon. For example, the pore size of the support preferably ranges from about 0.001 to 0.5 µm. Non-limiting examples of porous supports include those made of: polysulfone, polyether sulfone, polyimide, polyamide, polyetherimide, polyacrylonitrile, poly(methyl methacrylate), polyethylene, polypropylene, and various halogenated polymers such as polyvinylidene fluoride. For RO and NF applications, the porous support provides strength but offers little resistance to fluid flow due to its relatively high porosity.

Due to its relative thinness, the polyamide layer is often described in terms of its coating coverage or loading upon the porous support, e.g. from about 2 to 5000 mg of polyamide per square meter surface area of porous support and more preferably from about 50 to 500 mg/m². The polyamide layer is preferably prepared by an interfacial polycondensation reaction between a polyfunctional amine monomer and a polyfunctional acyl halide monomer upon the surface of the porous support as described in U.S. Pat. No. 4,277,344 and U.S. Pat. No. 6,878,278. More specifically, the polyamide membrane layer may be prepared by interfacially polymerizing a polyfunctional amine monomer with a polyfunctional acyl halide monomer, (wherein each term is intended to refer both to the use of a single species or multiple species), on at least one surface of a porous support. As used herein, the term "polyamide" refers to a polymer in which amide linkages (—C(O)NH—) occur along the molecular chain. The polyfunctional amine and polyfunctional acyl halide monomers are most commonly applied to the porous support by way of a coating step from solution, wherein the polyfunctional amine monomer is typically coated from an aqueous-based or polar solution and the polyfunctional acyl halide from an organic-based or non-polar solution. Although the coating steps need not follow a specific order, the polyfunctional amine monomer is preferably first coated on the porous support followed by the polyfunctional acyl halide. Coating can be accomplished by spraying, film coating, rolling, or through the use of a dip tank among other coating techniques. Excess solution may be removed from the support by air knife, dryers, ovens and the like.

The polyfunctional amine monomer comprises at least two primary amine groups and may be aromatic (e.g., m-phenylenediamine (mPD), p-phenylenediamine, 1,3,5-triaminobenzene, 1,3,4-triaminobenzene, 3,5-diaminobenzoic acid, 2,4-diaminotoluene, 2,4-diaminoanisole, and xylylenediamine) or aliphatic (e.g., ethylenediamine, propylenediamine, cyclohexanne-1,3-diameine and tris(2-diaminoethyl) amine). One particularly preferred polyfunctional amine is m-phenylene diamine (mPD). The polyfunctional amine monomer may be applied to the porous support as a polar solution. The polar solution may contain from about 0.1 to about 10 wt % and more preferably from about 1 to about 6 wt % polyfunctional amine monomer. In one set of embodiments, the polar solutions includes at least 2.5 wt % (e.g. 2.5 to 6 wt %) of the polyfunctional amine monomer. Once coated on the porous support, excess solution may be optionally removed.

The polyfunctional acyl halide monomer comprises at least two acyl halide groups and preferably no carboxylic acid functional groups and may be coated from a non-polar solvent although the polyfunctional acyl halide may be alternatively delivered from a vapor phase (e.g., for polyfunctional acyl halides having sufficient vapor pressure). The polyfunctional acyl halide is not particularly limited and aromatic or alicyclic polyfunctional acyl halides can be used along with combinations thereof. Non-limiting examples of aromatic polyfunctional acyl halides include: trimesic acyl chloride, terephthalic acyl chloride, isophthalic acyl chloride, biphenyl dicarboxylic acyl chloride, and naphthalene dicarboxylic acid dichloride. Non-limiting examples of alicyclic polyfunctional acyl halides include: cyclopropane tri carboxylic acyl chloride, cyclobutane tetra carboxylic acyl chloride, cyclopentane tri carboxylic acyl chloride, cyclopentane tetra carboxylic acyl chloride, cyclohexane tri carboxylic acyl chloride, tetrahydrofuran tetra carboxylic acyl chloride, cyclopentane dicarboxylic acyl chloride, cyclobutane dicarboxylic acyl chloride, cyclohexane dicarboxylic acyl chloride, and tetrahydrofuran dicarboxylic acyl chloride. One preferred polyfunctional acyl halide is trimesoyl chloride (TMC). The polyfunctional acyl halide may be dissolved in a non-polar solvent in a range from about 0.01 to 10 wt %, preferably 0.05 to 3% wt % and may be delivered as part of a continuous coating operation. In one set of embodiments wherein the polyfunctional amine monomer concentration is less than 3 wt %, the polyfunctional acyl halide is less than 0.3 wt %.

Suitable non-polar solvents are those which are capable of dissolving the polyfunctional acyl halide and which are immiscible with water; e.g. paraffins (e.g. hexane, cyclohexane, heptane, octane, dodecane), isoparaffins (e.g. ISOPAR™ L), aromatics (e.g. Solvesso™ aromatic fluids, Varsol™ non-dearomatized fluids, benzene, alkylated benzene (e.g. toluene, xylene, trimethylbenzene isomers, diethylbenzene)) and halogenated hydrocarbons (e.g. FREON™ series, chlorobenzene, di and trichlorobenzene) or mixtures thereof. Preferred solvents include those which pose little threat to the ozone layer and which are sufficiently safe in terms of flashpoints and flammability to undergo routine processing without taking special precautions. A preferred solvent is ISOPAR™ available from Exxon Chemical Company. The non-polar solution may include additional constituents including co-solvents, phase transfer agents, solubilizing agents, complexing agents and acid scavengers wherein individual additives may serve multiple functions. Representative co-solvents include: benzene, toluene, xylene, mesitylene, ethyl benzene-diethylene glycol dimethyl ether, cyclohexanone, ethyl acetate, butyl Carbitol™ acetate, methyl laurate and acetone. A representative acid scavenger includes N, N-diisopropylethylamine (DIEA). The non-polar solution may also include small quantities of water or other polar additives but preferably at a concentration below their solubility limit in the non-polar solution.

One or both of the polar and non-polar solutions preferably include a tri-hydrocarbyl phosphate compound as represented by Formula I:

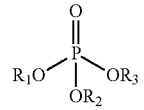

Formula (I)

wherein "P" is phosphorous, "O" is oxygen and $R_1$, $R_2$ and $R_3$ are independently selected from hydrogen and hydrocarbyl groups comprising from 1 to 10 carbon atoms, with the proviso that no more than one of $R_1$, $R_2$ and $R_3$ are hydrogen. $R_1$, $R_2$ and $R_3$ are preferably independently selected from aliphatic and aromatic groups. Applicable aliphatic groups include both branched and unbranched species, e.g. methyl, ethyl, propyl, isopropyl, butyl, isobutyl, pentyl, 2-pentyl, 3-pentyl. Applicable cyclic groups include cyclopentyl and cyclohexyl. Applicable aromatic groups include phenyl and naphthyl groups. Cyclo and aromatic groups may be linked to the phosphorous atom by way of an aliphatic linking group, e.g., methyl, ethyl, etc. The aforementioned aliphatic and aromatic groups may be unsubstituted or substituted (e.g., substituted with methyl, ethyl, propyl, hydroxyl, amide, ether, sulfone, carbonyl, ester, cyanide, nitrile, isocyanate, urethane, beta-hydroxy ester, etc); however, unsubstituted alkyl groups having from 3 to 10 carbon atoms are preferred. Specific examples of tri-hydrocarbyl phosphate compounds include: triethyl phosphate, tripropyl phosphate, tributyl phosphate, tripentyl phosphate, trihexyl phosphate, triphenyl phosphate, propyl biphenyl phosphate, dibutyl phenyl phosphate, butyl diethyl phosphate, dibutyl hydrogen phosphate, butyl heptyl hydrogen phosphate and butyl heptyl hexyl phosphate. The specific compound selected should be at least partially soluble in the solution from which it is applied. Additional examples are as such compounds are described in U.S. Pat. No. 6,878,278, U.S. Pat. No. 6,723,241, U.S. Pat. No. 6,562,266 and U.S. Pat. No. 6,337,018.

In a preferred class of embodiments, the non-polar solution preferably includes from 0.001 to 10 wt % and more preferably from 0.01 to 1 wt % of the tri-hydrocarbyl phosphate compound. In another embodiment, the non-polar solution includes the tri-hydrocarbyl phosphate compound in a molar (stoichiometric) ratio of 1:5 to 5:1 and more preferably 1:1 to 3:1 with the polyfunctional acyl halide monomer.

In a preferred subset of embodiments, the non-polar solution may additionally include an acid-containing monomer comprising a $C_2$-$C_{20}$ hydrocarbon moiety substituted with at least one carboxylic acid functional group or salt thereof and at least one amine-reactive functional group selected from: acyl halide, sulfonyl halide and anhydride, wherein the acid-containing monomer is distinct from the polyfunctional acyl halide monomer. In one set of embodiments, the acid-containing monomer comprises an arene moiety. Non-limiting examples include mono and di-hydrolyzed counterparts of the aforementioned polyfunctional acyl halide monomers including two to three acyl halide groups and mono, di and tri-hydrolyzed counterparts of the polyfunctional halide monomers that include at least four amine-reactive moieties. A preferred species includes 3,5-bis(chlorocarbonyl)benzoic acid (i.e. mono-hydrolyzed trimesoyl chloride or "mhTMC"). Additional examples of monomers are described in WO 2012/102942 and WO 2012/102943 (see Formula III wherein the amine-reactive groups ("Z") are selected from acyl halide, sulfonyl halide and anhydride). Specific species including an arene moiety and a single amine-reactive oup include: 3-carboxylbenzoyl chloride, 4-carboxylbenzoyl chloride, 4-carboxy phthalic anhydride, 5-carboxy phthalic anhydride, 3,5-bis(chlorocarbonyl)-4-methylbenzoic acid, 3,5-bis(chlorocarbonyl)-4-fluorobenzoic acid and 3,5-bis(chlorocarbonyl)-4-hydroxy-benzoic acid, and salts thereof. Additional examples are represented by Formula II:

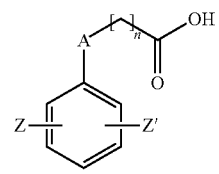

Formula (II)

wherein A is selected from: oxygen (e.g. —O—); amino (—N(R)—) wherein R is selected from a hydrocarbon group having from 1 to 6 carbon atoms, e.g. aryl, cycloalkyl, alkyl—substituted or unsubstituted but preferably alkyl having from 1 to 3 carbon atoms with or without substituents such as halogen and carboxyl groups); amide (—C(O)N(R))— with either the carbon or nitrogen connected to the aromatic ring and wherein R is as previously defined; carbonyl (—C(O)—); sulfonyl (—SO$_2$—); or is not present (e.g. as represented in Formula III); n is an integer from 1 to 6, or the entire group is an aryl group; Z is an amine reactive functional group selected from: acyl halide, sulfonyl halide and anhydride (preferably acyl halide); Z' is selected from the functional groups described by Z along with hydrogen and carboxylic acid. Z and Z' may be independently positioned meta or ortho to the A substituent on the ring. In one set of embodiments, n is 1 or 2. In yet another set of embodiments, both Z and Z' are both the same (e.g. both acyl halide groups). In another set of embodiments, A is selected from alkyl and alkoxy groups having from 1 to 3 carbon atoms. Non-limiting representative species include: 2-(3,5-bis(chlorocarbonyl)phenoxy)acetic acid, 3-(3,5-bis(chlorocarbonyl)phenyl) propanoic acid, 2-((1,3-dioxo-1,3-dihydroisobenzofuran-5-yl)oxy)acetic acid, 3-(1,3-dioxo-1,3-dihydroisobenzofuran-5-yl)propanoic acid, 2-(3-(chlorocarbonyl) phenoxy)acetic acid, 3-(3-(chlorocarbonyl)phenyl)propanoic acid, 3-((3,5bis(chlorocarbonyl)phenyl) sulfonyl) propanoic acid, 3-((3-(chlorocarbonyl)phenyl)sulfonyl)propanoic acid, 3-((1,3-dioxo-1,3-dihydroisobenzofuran-5-yl)sulfonyl)propanoic acid, 3-((1,3-dioxo-1,3-dihydroisobenzofuran-5-yl)amino) propanoic acid, 3-((1,3-dioxo-1,3-dihydroisobenzofuran-5-yl)(ethyl)amino)propanoic acid, 3-((3,5-bis(chlorocarbonyl)phenyl)amino) propanoic acid, 3-((3,5-bis(chlorocarbonyl)phenyl)(ethyl)amino) propanoic acid, 4-(4-(chlorocarbonyl)phenyl)-4-oxobutanoic acid, 4-(3,5-bis(chlorocarbonyl)phenyl)-4-oxobutanoic acid, 4-(1,3-dioxo-1,3-dihydroisobenzofuran-5-yl)-4-oxobutanoic acid, 2-(3,5-bis(chlorocarbonyl)phenyl)acetic acid, 2-(2,4-bis(chlorocarbonyl)phenoxy) acetic acid, 4-((3,5-bis(chlorocarbonyl)phenyl)amino)-4-oxobutanoic acid, 2-((3,5-bis(chloro carbonyl)phenyl)amino)acetic acid, 2-(N-(3,5-bis(chlorocarbonyl)phenyl)acetamido)acetic acid, 2,2'-((3,5-bis(chlorocarbonyl)phenylazanediyl) diacetic acid, N-[(1,3-dihydro-1,3-dioxo-5-isobenzofuranyl)carbonyl]-glycine, 4-[[(1,3-dihydro-1,3-dioxo-5-isobenzofuranyl)carbonyl]amino]-benzoic acid, 1,3-dihydro-1,3-dioxo-4-isobenzofuran propanoic acid, 5-[[(1,3-dihydro-1,3-dioxo-5-isobenzofuranyl)carbonyl]amino]-1,3-benzenedicarboxylic acid and 3-[(1,3-dihydro-1,3-dioxo-5-isobenzofuranyl)sulfonyl]-benzoic acid.

Another embodiment is represented by Formula III.

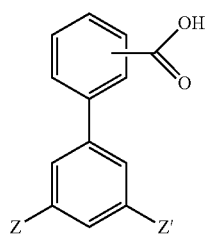

Formula (III)

wherein the carboxylic acid group may be located meta, para or ortho upon the phenyl ring.

Representative examples where the hydrocarbon moiety is an aliphatic group are represented by Formula IV:

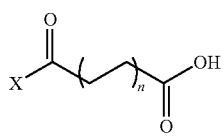

Formula (IV)

wherein X is a halogen (preferably chlorine) and n is an integer from 1 to 20, preferably 2 to 10. Representative species include: 4-(chlorocarbonyl) butanoic acid, 5-(chlorocarbonyl) pentanoic acid, 6-(chlorocarbonyl) hexanoic acid, 7-(chlorocarbonyl) heptanoic acid, 8-(chlorocarbonyl) octanoic acid, 9-(chlorocarbonyl) nonanoic acid, 10-(chlorocarbonyl) decanoic acid, 11-chloro-11-oxoundecanoic acid, 12-chloro-12-oxododecanoic acid, 3-(chlorocarbonyl) cyclobutanecarboxylic acid, 3-(chlorocarbonyl)cyclopentane carboxylic acid, 2,4-bis(chlorocarbonyl)cyclopentane carboxylic acid, 3,5-bis(chlorocarbonyl) cyclohexanecarboxylic acid, and 4-(chlorocarbonyl) cyclohexanecarboxylic acid. While the acyl halide and carboxylic acid groups are shown in terminal positions, one or both may be located at alternative positions along the aliphatic chain. While not shown in Formula (IV), the acid-containing monomer may include additional carboxylic acid and acyl halide groups.

Representative examples of acid-containing monomers include at least one anhydride group and at least one carboxylic acid groups include: 3,5-bis(((butoxycarbonyl) oxy)carbonyl)benzoic acid, 1,3-dioxo-1,3-dihydroisobenzofuran-5-carboxylic acid, 3-(((butoxycarbonyl)oxy)carbonyl) benzoic acid, and 4-(((butoxycarbonyl)oxy)carbonyl) benzoic acid.

The upper concentration range of acid-containing monomer may be limited by its solubility within the non-polar solution and is dependent upon the concentration of the tri-hydrocarbyl phosphate compound, i.e. the tri-hydrocarbyl phosphate compound is believed to serve as a solubilizer for the acid-containing monomer within the non-polar solvent. In most embodiments, the upper concentration limit is less than 1 wt %. In one set of embodiments, the acid-containing monomer is provided in the non-polar solution at concentration of at least 0.01 wt %, 0.02 wt %, 0.03 wt %, 0.04 wt %, 0.05 wt %, 0.06 wt %, 0.07 wt %, 0.08 wt %, 0.1 wt % or even 0.13 wt % while remaining soluble in solution. In another set of embodiments, the non-polar solution comprises from 0.01 to 1 wt %, 0.02 to 1 wt %, 0.04 to 1 wt % or 0.05 to 1 wt % of the acid-containing monomer. The inclusion of the acid-containing monomer during interfacial polymerization between the polyfunctional amine and acyl halide monomers results in a membrane having improved performance. And, unlike post hydrolysis reactions that may occur on the surface of the thin-film polyamide layer, the inclusion of the acid-containing monomer during interfacial polymerization is believed to result in a polymer structure that is beneficially modified throughout the thin-film layer.

In a preferred embodiment, the thin film polyamide layer is characterized by having a dissociated carboxylate content of at least 0.18, 0.20, 0.22, 0.3, 0.4 and in some embodiments at least 0.45 moles/kg of polyamide at pH 9.5 as measured by a Rutherford Backscattering (RBS) measurement technique. More specifically, sample membranes (1 inch×6 inch) are boiled for 30 minutes in deionized water (800 mL), then placed in a 50/50 w/w solution of methanol and water (800 mL) to soak overnight. Next, 1 inch×1 inch size sample of these membranes are immersed in a 20 mL $1 \times 10^{-4}$ M $AgNO_3$ solution with pH adjusted to 9.5 for 30 minutes. Vessels containing silver ions are wrapped in tape and to limit light exposure. After soaking with the silver ion solution, the unbound silver is removed by soaking the membranes in 2 clean 20 mL aliquots of dry methanol for 5 minutes each. Finally, the membranes are allowed to dry in a nitrogen atmosphere for a minimum of 30 minutes. Membrane samples are mounted on a thermally and electrically conductive double sided tape, which was in turn mounted to a silicon wafer acting as a heat sink. The tape is preferably Chromerics Thermattach T410 or a 3M copper tape. RBS measurements are obtained with a Van de Graff accelerator (High Voltage Engineering Corp., Burlington, Mass.); A 2 MeV He room temperature beam with a diameter of 3 mm at an incident angle of 22.5°, exit angle of 52.5°, scattering angle of 150°, and 40 nanoamps (nAmps) beam current. Membrane samples are mounted onto a movable sample stage which is continually moved during measurements. This movement allows ion fluence to remain under $3 \times 10^{14}$ $He^+/cm^2$. Analysis of the spectra obtained from RBS is carried out using SIMNRA®, a commercially available simulation program. A description of its use to derive the elemental composition from RBS analysis of RO/NF membranesis described by; Coronell, et. al. *J. of Membrane Sci.* 2006, 282, 71-81 and *Environmental Science & Technology* 2008, 42(14), 5260-5266. Data can be obtained using the SIMNRA® simulation program to fit a two layer system, a thick polysulfone layer beneath a thin polyamide layer, and fitting a three-layer system (polysulfone, polyamide, and surface coating) can use the same approach. The atom fraction composition of the two layers (polysulfone before adding the polyamide layer, and the surface of final TFC polyamide layer) is measured first by XPS to provide bounds to the fit values. As XPS cannot measure hydrogen, an H/C ratio from the proposed molecular formulas of the polymers were used, 0.667 for polysulfone and a range of 0.60-0.67 was used for polyamide Although the polyamides titrated with silver nitrate only introduces a small amount of silver, the scattering cross section for silver is substantially higher than the other low atomic number elements (C, H, N, O, S) and the size of the peak is disproportionately large to the others despite being present at much lower concentration thus providing good sensitivity. The concentration of silver is determined using the two layer modeling approach in SIMNRA® by fixing the composition of the polysulfone and fitting the silver peak while maintaining a narrow window of composition for the polyamide layer (layer 2, ranges predetermined using XPS). From the simulation, a molar concentration for the elements in the polyamide layer (carbon, hydrogen, nitrogen, oxygen and silver) is determined. The silver concentration is a direct reflection of the carboxylate molar concentration available for binding silver at the pH of the testing conditions. The moles of carboxylic acids groups per unit area of membrane is indicative of the number of interactions seen by a species passing through the membrane, and a larger number will thus favorably impact salt passage. This value may be calculated by multiplying the measured carboxylate content by a measured thickness and by the polyamide density.

A preferred method to determine the dissocated carboxylate number at pH 9.5 per unit area of membrane for a thin film polyamide membrane is as follows. A membrane sample is boiled for 30 minutes in deionized water, then placed in a 50 wt % solution of methanol in water to soak overnight. Next, the membrane sample is immersed in a $1\times10^{-4}$ M $AgNO_3$ solution with pH adjusted to 9.5 with NaOH for 30 minutes. After soaking in the silver ion solution, the unbound silver is removed by soaking the membranes twice in dry methanol for 30 minutes. The amount of silver per unit area is preferably determined by ashing, as described by Wei, and redissolving for measurement by ICP. Preferably, the dissocated carboxylate number at pH 9.5 per square meter of membrane is greater than $6\times10^{-5}$, $8\times10^{-5}$, $1\times10^{-4}$, $1.2\times10^{-4}$, $1.5\times10^{-4}$, $2\times10^{-4}$, or even $3\times10^{-4}$ moles/m$^2$.

In another preferred embodiment, pyrolysis of the thin film polyamide layer at 650° C. results in a ratio of responses from a flame ionization detector for fragments produced at 212 m/z and 237 m/z of less than 2.8, and more preferably less than 2.6. The fragments produced at 212 and 237 m/z are represented by Formula V and VI, respectively.

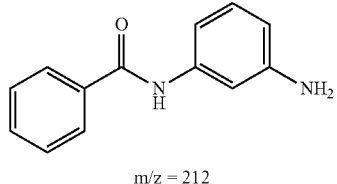

Formula (V)

m/z = 212

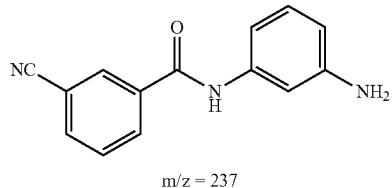

Formula (VI)

m/z = 237

This ratio of fragments is believed to be indicative of polymer structures that provide improved flux, salt passage or integrity (particularly for membranes having relatively high carboxylic acid content, e.g. a dissociated carboxylate content of at least 0.18, 0.20, 0.22, 0.3, and in some embodiments at least 0.4 moles/kg of polyamide at pH 9.5). Investigation has shown that dimer fragment 212 m/z forms predominantly during pyrolysis temperatures below 500° C. whereas dimer fragment 237 m/z predominantly forms at pyrolysis temperatures above 500° C. This indicates that dimer fragment 212 originates from end groups where only single bound cleavage prevails and that dimer fragment 237 originates substantially from the bulk material where multiple bond cleavages and reduction occurs. Thus, the ratio of dimer fragment 212 to 237 can be used as a measure of relative conversion.

A preferred pyrolysis methodology is conducted using gas chromatography mass spectrometry with mass spectral detection, e.g. a Frontier Lab 2020iD pyrolyzer mounted on an Agilent 7890 GC with detection using a LECO time of flight (TruTOF) mass spectrometer. Peak area detection is made using a flame ionization detector (FID). Pyrolysis is conducted by dropping the polyamide sample cup into pyrolysis oven set at 650° C. for 6 seconds in single shot mode. Separation is performed using a 30M×0.25 mm id column from Varian (FactorFour VF-5MS CP8946) with a 1 um 5% phenyl methyl silicone internal phase. Component identification is made by matching the relative retention times of the fragment peaks to that of the same analysis performed with a LECO time of flight mass spectrometer (or optionally by matching mass spectra to a NIST database or references from literature). Membrane samples are weighed into Frontier Labs silica lined stainless steel cups using a Mettler E20 micro-balance capable of measuring to 0.001 mg. Sample weight targets were 200 ug+/−50 ug. Gas chromatograph conditions are as follows: Agilent 6890 GC (SN: CN10605069), with a 30M×0.25 mm, 1 μm 5% dimethyl polysiloxane phase (Varian FactorFour VF-5MS CP8946); injection port 320° C., Detector port: 320° C., Split injector flow ratio of 50:1, GC Oven conditions: 40° C. to 100° C. at 6° C. per min., 100° C. to 320° C. at 30° C./min, 320° C. for 8 min; Helium carrier gas with constant flow of 0.6 mL/min providing a back pressure of 5.0 psi. LECO TruTOF Mass Spectrometer Parameters are as follows: electron ionization source (positive EI mode), Scan Rate of 20 scans per second, Scan range: 14-400 m/z; Detector voltage=3200 (400V above tune voltage); MS acquisition delay=1 min; Emission Voltage −70V. The peak area of the fragment 212 m/z and fragment 237 m/z are normalized to the sample weight. The normalized peak areas are used to determine the ratio of fragments 212 m/z to 237 m/z. Further the normalize peak area of fragment 212 m/z is divided by the sum of the normalized peak areas for all other fragments providing a fraction of the m/z 212 fragment relative to the polyamide and is commonly noted as a percent composition by multiplying by 100. Preferably this value is less than 12%.

In yet another preferred embodiment, the thin film layer has an isoelectric point (IEP) of less than or equal to 4.3, 4.2, 4.1, 4, 3.8, 3.6 or in some embodiments 3.5. The isoelectric point can be determined using a standard Zeta-Potential technique with a quartz cell by electrophoretic light scattering (ELS) using Desal Nano HS instrument. For example, membrane samples (2 inch×1 inch) are first boiled for 20 minutes in DI water, then rinsed well with room temperature DI water and stored at room temperature in a fresh DI solution overnight. The samples are then loaded as per reference: 2008 "User's Manual for the Delsa™ Nano Submicron Particle Size and Zeta Potential," and the "Pre-Course Reading" for the same instrument presented by Beckmann Coulter. pH titration is completed over a range from pH 10 to pH 2 and isoelectric point is determined at the pH where the zeta potential becomes zero.

Once brought into contact with one another, the polyfunctional acyl halide and polyfunctional amine monomers react at their surface interface to form a polyamide layer or film. This layer, often referred to as a polyamide "discriminating layer" or "thin film layer," provides the composite membrane with its principal means for separating solute (e.g. salts) from solvent (e.g. aqueous feed). The reaction time of the polyfunctional acyl halide and the polyfunctional amine monomer may be less than one second but contact times typically range from about 1 to 60 seconds. The removal of the excess solvent can be achieved by rinsing the membrane with water and then drying at elevated temperatures, e.g. from about 40° C. to about 120° C., although air drying at ambient temperatures may be used. However, for purposes of the present invention, the membrane is preferably not permitted to dry and is simply rinsed (e.g. dipped) with water and optionally stored in a wet state.

The polyamide layer is subsequently treated with a polyfunctional arene compound including 1 or 2 (preferably 1) benzene rings (which may be fused; or linked (L) by a direct bond between the rings, an alkylene group comprising from 1 to 6 carbon atoms and an oxyalkylene group comprising from 1 to 6 carbon atoms) that are collectively substituted with:

a) a first functional group (w) selected from: —NR$_4$R$_5$ (amine,) and —OH (hydroxyl), b) a second functional group (x) selected from: —NR$_4$R$_5$ (amine), —OH (hydroxyl), —COOH (carboxylic acid) and —SO$_3$H (sulfonic acid), and c) a third functional group (y) selected from: —H (hydrogen), —NR$_4$R$_5$ (amine), —OH (hydroxyl), —COOH (carboxylic acid) and —SO$_3$H (sulfonic acid).

d) a fourth functional group (z) selected from: —H (hydrogen), —CH$_3$ (methyl), —NR$_4$R$_5$ (amine), —OH (hydroxyl), —COOH (carboxylic acid) and —SO$_3$H (sulfonic acid);

wherein (R$_4$) and (R$_5$) are independently selected from: —H and hydrocarbyl groups (preferably alkyl groups having from 1 to 4 carbon atoms) including from 1 to 10 carbon atoms. The benzene ring(s) may be further substituted with additional functional groups including those listed above with respect to (w), (x), (y) and (z), or other groups such as methyl groups, ethyl groups and halogens. The substituent groups (w), (x), (y) and (z) may be located meta, ortho or para to one another. Applicable polyfunctional arene compounds are represented by Formulae VII-IX:

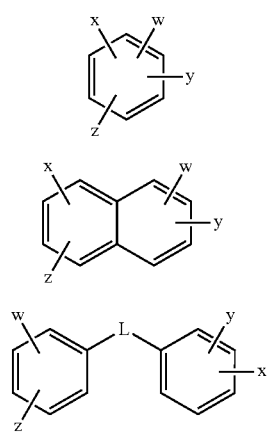

Formula VII

Formula (VIII)

Formula (IX)

wherein (L) is selected from: a direct bond between the rings, an alkylene group comprising from 1 to 6 carbon atoms and an oxyalkylene group comprising from 1 to 6 carbon atoms.

In another preferred set of embodiments and with continued reference to Formulae VII-IX:

a) (w) is selected from: —NR$_4$R$_5$ and —OH, b) (x) is selected from: —COOH and —SO$_3$H, c) (y) is selected from: —H, —COOH and —SO$_3$H, and d) (z) is selected from: —H, —CH, —COOH, and —SO$_3$H.

In another preferred set of embodiments the polyfunctional arene compound is a crosslinker wherein:

a) (w) is selected from: —NR$_4$R$_5$, b) (x) is selected from: —OH, c) (y) selected from: —H, —COOH, and —SO$_3$H, and d) (z) selected from: —H, —CH, —COOH, and —SO$_3$H.

In another preferred subset of embodiments, (y) is selected from: —COOH and —SO$_3$H (i.e. a crosslinker with acid functionality) and (z) is —H, as represented by Formulae X and XI.

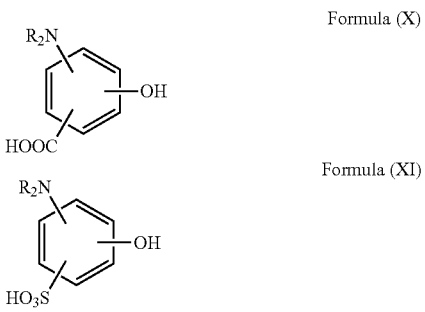

Formula (X)

Formula (XI)

In yet another preferred set of embodiments, (w) and (x) are selected from amines (—NR$_4$R$_5$ wherein R$_4$ and R$_5$ are independently selected from: wherein (R$_4$) and (R$_5$) are independently selected from: —H and hydrocarbyl groups (preferably alkyl groups having from 1 to 4 carbon atoms) including from 1 to 10 carbon atoms; and (y) and (z) are Hydrogen. Applicable species are as represented as follows:

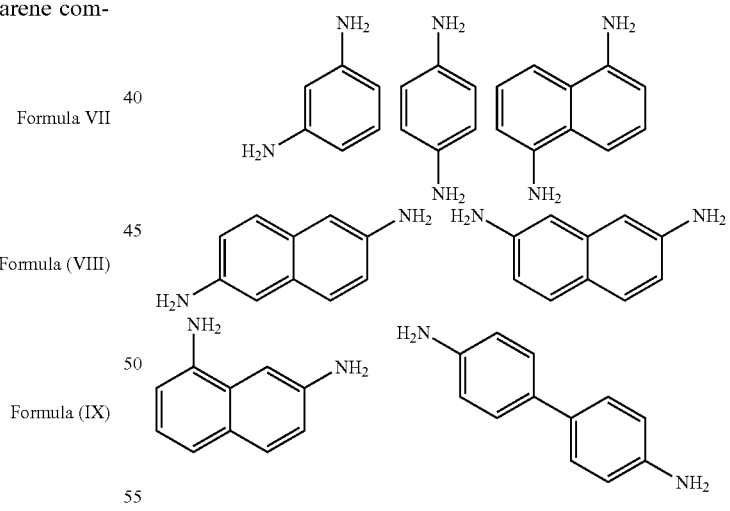

In another preferred embodiment, the polyfunctional arene compound is selected from at least one of: 2-aminobenzoic acid, 3-aminobenzoic acid, 4-aminobenzoic acid, 2-aminobenzenesulfonic acid, 3-aminobenzenesulfonic acid, 4-aminobenzenesulfonic acid, 2-aminophenol, 3-aminophenol, 4-aminophenol, 2-hydroxybenzoic acid, 3-hydroxybenzoic acid, 4-hydroxybenzoic acid, 2-hydroxybenzenesulfonic acid, 3-hydroxybenzenesulfonic acid, 4-hydroxybenzenesulfonic acid, 3,5-dihydroxyaniline, 2,4-dihydroxyaniline 3,5-diaminobenzoic acid, 2,4-diaminobenzoic acid, 2-hydroxy-4-aminobenzoic acid, 2-hydroxy-5-aminobenzoic acid, 2-hydroxy-4-aminobenzenesulfonic acid, 2-hydroxy-5-aminobenzenesulfonic acid, 2,4-diaminobenzenesulfonic acid, 3,5-diaminobenzenesulfonic acid, 2,hydroxyl-6-aminobenzenesulfonic acid, 2-hydroxy-4-methyl-5-aminobenzoic acid, 2,6-dihydroxy-5-aminobenzoic acid, 2,4-dihydroxy-5-aminobenzoic acid, 2-hydroxy-3,5-diaminobenzoic acid, 2-hydroxy-4-chloro-5-aminobenzoic acid, 2-hydroxy-5-amino-6-sulfobenzoic acid, 3-hydroxy-5-aminobenzenesulfonic acid, 3-hydroxy-4-methyl-5-aminobenzenesulfonic acid, 2-methyl-3-amino-5-hydroxybenzenesulfonic acid, 2-hydroxy-4-amino-6-sulfobenzoic acid, 4-amino-5-hydroxy-2,7-naphthalenedisulfonic acid, 8-amino-4-hydroxy-2,6-naphthalenedisulfonic acid, 3-amino-8-hydroxy-1,5-naphthalenedisulfonic acid, 3-hydroxy-8-amino-1,5-naphthalenedisulfonic acid, 4-amino-5-hydroxy-1,7-naphthalenedisulfonic acid, 4-hydroxy-6-amino-2-napthalenesulfonic acid, 4-hydroxy-5-amino-2-napthalenesulfonic acid, 2-amino-5-hydroxy-1,7-naphthalenedisulfonic acid, 4-hydroxy-7-amino-2,6-naphthalenedisulfonic acid, 4-hydroxy-6-amino-2,7-naphthalenedisulfonic acid, 4,4'-diaminobiphenyl-2-sulfonic acid, 4,4'-diaminobiphenyl-2,2'-disulfonic acid, 4,4'diaminobiphenyl-2-carboxylic acid, 4,4'-diaminobiphenyl-2,2'-dicarboxylic acid, 4,4'-dihydroxybiphenyl-2-carboxylic acid, 4,4'-dihydroxybiphenyl-2,2'-dicarboxylic acid, 4,4'-dihydroxybiphenyl-2-sulfonic acid, 4,4'-dihydroxybiphenyl-2,2'-disulfonic acid, 1,4,7-triaminonaphthalene, 1,4,7-trihydroxynaphthalene.

The method of treating the polyamide layer with the subject polyfunctional arene compounds is not particularly limited and includes applying the polyfunctional arene (e.g. 10-20000 ppm) from an aqueous solution with a pH range of 3-11, which may further include 1-20 wt % alcohol such as methanol, isopropanol and polar aprotic solvents such as DMSO, DMF, DMAc, NMP, etc, such that the polyfunctional arene compound remains predominately on the outer surface (surface opposite to that contacting the porous support) of the polyamide layer, or soaking the polyamide layer in a dip tank containing the polyfunctional arene compound such that the polyamide layer becomes impregnated with the compound. The polyfunctional arene compound is applied to the polyamide layer in combination with the step of exposing the polyamide layer to nitrous acid, (e.g. the polyfunctional arene compound may be applied to the polyamide layer before, during or after exposure to nitrous acid, but preferably before).

A variety of applicable techniques for exposing the polyamide layer to nitrous acid are described in U.S. Pat. No. 4,888,116 and are incorporated herein by reference. It is believed that the nitrous acid reacts with the residual primary amine groups present in the polyamide discrimination layer to form diazonium salt groups, a portion of which react with selected functional groups of the subject polyfunctional arene compounds and residual unreacted amines in the polyamide layer to form azo groups, i.e. form crosslinks in the polyamide structure.

In one embodiment, an aqueous solution of nitrous acid is applied to the thin film polyamide layer. Although the aqueous solution may include nitrous acid, it preferably includes reagents that form nitrous acid in situ, e.g. an alkali metal nitrite in an acid solution or nitrosyl sulfuric acid. Because nitrous acid is volatile and subject to decomposition, it is preferably formed by reaction of an alkali metal nitrite in an acidic solution in contact with the polyamide discriminating layer. Generally, if the pH of the aqueous solution is less than about 7, (preferably less than about 5), an alkali metal nitrite will react to liberate nitrous acid. Sodium nitrite reacted with hydrochloric or sulfuric acid in an aqueous solution is especially preferred for formation of nitrous acid. The aqueous solution may further include wetting agents or surfactants. The concentration of the nitrous acid in the aqueous solution is preferably from 0.01 to 1 wt %. Generally, the nitrous acid is more soluble at 5° than at 20° C. and somewhat higher concentrations of nitrous acid are operable at lower temperatures. Higher concentrations are operable so long as the membrane is not deleteriously affected and the solutions can be handled safely. In general, concentrations of nitrous acid higher than about one-half (0.5) percent are not preferred because of difficulties in handling these solutions. Preferably, the nitrous acid is present at a concentration of about 0.1 weight percent or less because of its limited solubility at atmospheric pressure. The temperature at which the membrane is contacted can vary over a wide range. Inasmuch as the nitrous acid is not particularly stable, it is generally desirable to use contact temperatures in the range from about 0° to about 30° C., with temperatures in the range from 0° to about 20° C. being preferred. Temperatures higher than this range can increase the need for ventilation or super-atmospheric pressure above the treating solution. Temperatures below the preferred range generally result in reduced reaction and diffusion rates.

One preferred application technique involves passing the aqueous nitrous acid solution over the surface of the membrane in a continuous stream. This allows the use of relatively low concentrations of nitrous acid. When the nitrous acid is depleted from the treating medium, it can be replenished and the medium recycled to the membrane surface for additional treatment. Batch treatments are also operable. The specific technique for applying aqueous nitrous acid is not particularly limited and includes spraying, film coating, rolling, or through the use of a dip tank among other application techniques. Once treated the membrane may be washed with water and stored either wet or dry prior to use.

The reaction between the nitrous acid and the primary amine groups of the polyamide layer occurs relatively quickly once the nitrous acid has diffused into the membrane. The time required for diffusion and the desired reaction to occur will depend upon the concentration of nitrous acid, any pre-wetting of the membrane, the concentration of primary amine groups present, the 3 dimensional structure of the membrane and the temperature at which contact occurs. Contact times may vary from a few minutes to a few days. The optimum reaction time can be readily determined empirically for a particular membrane and treatment. The polyfunctional arene compound is added to the membrane as a basic aqueous solution either prior to treatment with nitrous acid or immediately following the addition of nitrous acid. After the residual amine moieties have been converted to the diazonium salts, the pH is raised to 9 and the temperature is increased to 25° C. to initiate the diazo coupling. The nucleophilic polyfunctional arene group reacts with the diazonium salt to form a new C—N bond via a diazo linkage. The polyfunctional arene compounds are sufficiently more reactive than simple phenols formed from hydrolysis of the diazonium salts, and are therefore incorporated into the membrane. In a preferred embodiment, the size of the polyfunctional arene compound isolates its coupling to the surface of the membrane, i.e. because it is too large to diffuse into the polyamide layer. The polyfunctional arene compounds are bifunctional, (i.e. contain at least two dihydroxyaryl groups), and can therefore form crosslinks on the surface of the membrane.

The thin film polyamide layer may optionally include hygroscopic polymers upon at least a portion of its surface. Such polymers include polymeric surfactants, polyacrylic acid, polyvinyl acetate, polyalkylene oxide compounds, poly(oxazoline) compounds, polyacrylamides and related reaction products as generally described in U.S. Pat. No. 6,280,853; U.S. Pat. No. 7,815,987; U.S. Pat. No. 7,918,349 and U.S. Pat. No. 7,905,361. In some embodiments, such polymers may be blended and/or reacted and may be coated or otherwise applied to the polyamide membrane from a common solution, or applied sequentially.

Many embodiments of the invention have been described and in some instances certain embodiments, selections, ranges, constituents, or other features have been characterized as being "preferred." Characterizations of "preferred" features should in no way be interpreted as deeming such features as being required, essential or critical to the invention.

EXAMPLES

Sample membranes were prepared using a pilot scale membrane manufacturing line. Polysulfone supports were casts from 16.5 wt % solutions in dimethylformamide (DMF) and subsequently soaked in an aqueous solution of meta-phenylene diamine (mPD); (3.5 wt % unless otherwise stated). The resulting support was then pulled through a reaction table at constant speed while a thin, uniform layer of a non-polar coating solution was applied. The non-polar coating solution included a isoparaffinic solvent (ISOPAR L), various combinations of trimesoyl acid chloride (TMC), 1-carboxy-3,5-dichloroformyl benzene (mhTMC) and/or tri butyl phosphate (TBP). Unless otherwise provided, "Control" membranes excluded acid containing monomers and tri-hydrocarbyl phosphate compounds. Unless otherwise provided, the total acyl halide content was fixed at 0.2% w/v. Excess non-polar solution was removed and the resulting composite membrane was passed through water rinse tanks and drying ovens. Sample membrane sheets were then either (i) stored in deionized water until testing; or (ii) "post-treated" by being soaked for approximately 15 minutes in a solution at 0-10° C. prepared by combining 0.05% w/v $NaNO_2$ and 0.1 w/v % HCl and thereafter rinsed and stored in deionized water until testing. Unless otherwise specified, sample membranes were tested using an aqueous solution including 2000 ppm NaCl at 25° C. and 150 psi. "SP" refers to NaCl passage.

Example 1

In order to illustrate the synergistic impact of preparing composite polyamide membranes with a tri-hydrocarbyl compound along with post-treatment with nitrous acid, a series of membrane were prepared using various quantities (expressed as wt %) of mPD and TMC, both with and without TBP (expressed as a stoichiometric ratio with TMC). Samples subjected to post-treatment with nitrous acid are designed with an asterisk (*). As shown by the test results summarized in Table 1, post-treatment of samples including tri-hydrocarbyl compound had an unexpected improvement in flux over comparable post-treated membranes without a tri-hydrocarbyl compound.

TABLE 1

| Sample | mPD (wt %) | TMC (wt %) | TBP (stoich) | Mean (AvgFlux) GFD | Mean (Avg SP) | Std Dev (Avg Flux) | Std Dev (Avg SP) | % change in Flux |
|---|---|---|---|---|---|---|---|---|
| 1-1a | 2.5 | 0.20 | 0 | 11.8 | 1.83% | 0.27 | 0.36 | |
| *1-1b | 2.5 | 0.20 | 0 | 11.7 | 2.19% | 0.69 | 0.92 | -1.0 |
| 1-1c | 2.5 | 0.20 | 1.5 | 52.1 | 1.50% | 1.39 | 0.24 | |
| *1-1d | 2.5 | 0.20 | 1.5 | 68.1 | 1.77% | 2.55 | 0.13 | 30.6 |
| 1-2a | 2.5 | 0.25 | 0 | 8.2 | 1.98% | 0.04 | 0.04 | |
| *1-2b | 2.5 | 0.25 | 0 | 7.9 | 1.99% | 0.73 | 0.11 | -3.1 |
| 1-2c | 2.5 | 0.25 | 1.5 | 45.7 | 2.02% | 0.98 | 0.35 | |
| *1-2d | 2.5 | 0.25 | 1.5 | 50.4 | 2.19% | 4.35 | 0.92 | 10.2 |
| 1-3a | 2.5 | 0.30 | 0 | 6.3 | 1.86% | 0.24 | 0.08 | |
| *1-3b | 2.5 | 0.30 | 0 | 6.6 | 2.38% | 0.37 | 0.46 | 5.3 |
| 1-3c | 2.5 | 0.30 | 1.5 | 37.0 | 3.69% | 1.26 | 0.46 | |
| *1-3d | 2.5 | 0.30 | 1.5 | 38.6 | 4.73% | 0.53 | 0.27 | 4.4 |
| 1-4a | 3.5 | 0.20 | 0 | 20.7 | 0.74% | 0.36 | 0.08 | |
| *1-4b | 3.5 | 0.20 | 0 | 24.0 | 0.95% | 0.36 | 0.08 | 15.8 |
| 1-4c | 3.5 | 0.20 | 1.5 | 36.2 | 0.63% | 0.72 | 0.02 | |
| *1-4d | 3.5 | 0.20 | 1.5 | 48.3 | 0.73% | 1.63 | 0.01 | 33.6 |
| 1-5a | 3.5 | 0.25 | 0 | 13.9 | 0.97% | 0.44 | 0.07 | |
| *1-5b | 3.5 | 0.25 | 0 | 14.9 | 1.11% | 0.56 | 0.03 | 6.6 |
| 1-5c | 3.5 | 0.25 | 1.5 | 40.7 | 0.75% | 1.39 | 0.13 | |
| *1-5d | 3.5 | 0.25 | 1.5 | 52.7 | 0.92% | 1.92 | 0.02 | 29.3 |
| 1-6a | 3.5 | 0.30 | 0 | 11.9 | 1.18% | 1.16 | 0.03 | |
| *1-6b | 3.5 | 0.30 | 0 | 11.9 | 1.21% | 1.57 | 0.17 | -0.6 |
| 1-6c | 3.5 | 0.30 | 1.5 | 40.3 | 0.94% | 0.84 | 0.08 | |
| *1-6d | 3.5 | 0.30 | 1.5 | 52.6 | 1.22% | 1.94 | 0.09 | 30.5 |
| 1-7a | 4.5 | 0.20 | 0 | 22.6 | 0.65% | 0.54 | 0.01 | |
| *1-7b | 4.5 | 0.20 | 0 | 27.6 | 0.63% | 0.14 | 0.02 | 21.8 |
| 1-7c | 4.5 | 0.20 | 1.5 | 23.9 | 0.57% | 0.49 | 0.06 | |
| *1-7d | 4.5 | 0.20 | 1.5 | 32.6 | 0.51% | 0.39 | 0.01 | 36.3 |

Example 2

In order to illustrate the synergistic impact of preparing composite polyamide membranes with both a tri-hydrocarbyl compound and an acid-containing monomer along with post-treatment with nitrous acid, a series of membrane were prepared using various quantities of mPD and TMC, with and without TBP and mh TMC. Samples subjected to post-treatment with nitrous acid are designed with an asterisk (*). As shown by the test results summarized in Tables 2-1 and 2-2, post-treatment of samples including a tri-hydrocarbyl compound (TBP) and an acid-containing monomer (mhTMC) had an unexpected improvement in flux as compared with membranes without post-treatment, or those with post treatment but without a tri-hydrocarbyl compound an acid-containing monomer.

TABLE 2-1

| Sample | mPD (wt %) | TMC (wt %) | TBP (Stoich) | mhTMC (wt %) | Mean (Avg Flux) GFD | Mean (Avg SP) | Std Dev (Avg Flux) | Std Dev (Avg SP) | % change in Flux |
|---|---|---|---|---|---|---|---|---|---|
| 2-1a | 2.5 | 0.20 | 0 | 0 | 11.8 | 1.83% | 0.27 | 0.36 | |
| *2-1b | 2.5 | 0.20 | 0 | 0 | 11.7 | 2.19% | 0.69 | 0.92 | −1.0 |
| 2-1c | 2.5 | 0.16 | 1.5 | 0.04 | 51.1 | 1.63% | 0.79 | 0.11 | |
| *2-1d | 2.5 | 0.16 | 1.5 | 0.04 | 74.8 | 1.47% | 0.66 | 0.11 | 46.4 |
| 2-2a | 2.5 | 0.25 | 0 | 0 | 8.2 | 1.98% | 0.04 | 0.04 | |
| *2-2b | 2.5 | 0.25 | 0 | 0 | 7.9 | 1.99% | 0.73 | 0.11 | −3.1 |
| 2-2c | 2.5 | 0.21 | 1.5 | 0.04 | 51.9 | 0.86% | 1.07 | 0.06 | |
| *2-2d | 2.5 | 0.21 | 1.5 | 0.04 | 63.8 | 0.96% | 0.69 | 0.04 | 22.9 |
| 2-3a | 3.5 | 0.20 | 0 | 0 | 20.7 | 0.74% | 0.36 | 0.08 | |
| *2-3b | 3.5 | 0.20 | 0 | 0 | 24.0 | 0.95% | 0.36 | 0.08 | 15.8 |
| 2-3c | 3.5 | 0.16 | 1.5 | 0.04 | 26.3 | 2.28% | 0.80 | 0.75 | |
| *2-3d | 3.5 | 0.16 | 1.5 | 0.04 | 40.4 | 1.52% | 0.93 | 0.12 | 53.6 |
| 2-4a | 3.5 | 0.25 | 0 | 0 | 13.9 | 0.97% | 0.44 | 0.07 | |
| *2-4b | 3.5 | 0.25 | 0 | 0 | 14.9 | 1.11% | 0.56 | 0.03 | 6.6 |
| 2-4c | 3.5 | 0.21 | 1.5 | 0.04 | 40.2 | 0.37% | 1.36 | 0.03 | |
| *2-4d | 3.5 | 0.21 | 1.5 | 0.04 | 57.4 | 0.60% | 0.70 | 0.07 | 42.9 |
| 2-5a | 3.5 | 0.30 | 0 | 0 | 11.9 | 1.18% | 1.16 | 0.03 | |
| *2-5b | 3.5 | 0.30 | 0 | 0 | 11.9 | 1.21% | 1.57 | 0.17 | −0.6 |
| 2-5c | 3.5 | 0.26 | 1.5 | 0.04 | 45.5 | 0.52% | 0.24 | 0.03 | |
| *2-5d | 3.5 | 0.26 | 1.5 | 0.04 | 59.4 | 0.73% | 0.86 | 0.08 | 30.4 |
| 2-5a | 4.5 | 0.20 | 0 | 0 | 22.6 | 0.65% | 0.54 | 0.01 | |
| *2-5b | 4.5 | 0.20 | 0 | 0 | 27.6 | 0.63% | 0.14 | 0.02 | 21.8 |
| 2-5c | 4.5 | 0.16 | 1.5 | 0.04 | 20.1 | 0.36% | 0.24 | 0.01 | |
| *2-5d | 4.5 | 0.16 | 1.5 | 0.04 | 29.6 | 0.36% | 0.56 | 0.02 | 47.2 |

TABLE 2-2

| Sample | mPD (wt %) | TMC (wt %) | TBP (Stoich) | mhTMC (wt %) | Dissociated Carboxylate (moles/kg) | 212:237 m/z ratio |
|---|---|---|---|---|---|---|
| 2-3c | 3.5 | 0.16 | 1.5 | 0.04 | 0.375 | 2.1 |
| 2-4c | 3.5 | 0.21 | 1.5 | 0.04 | 0.35 | 1.8 |
| 2-5c | 3.5 | 0.26 | 1.5 | 0.04 | 0.31 | 1.7 |

Example 3

In order to illustrate the effect of preparing composite polyamide membranes with both a tri-hydrocarbyl compound and increasing quantities of acid-containing monomer along with post-treatment with nitrous acid, a series of membranes were prepared using various quantities of mPD, TMC, and TBP, with and without mh TMC. Samples subjected to post-treatment with nitrous acid are designed with an asterisk (*). Testing was conducted with a 250 ppm NaCl solution at room temperature and 70 psi. As shown by the test results summarized in Table 3, post-treatment of samples including a tri-hydrocarbyl compound (TBP) and an acid-containing monomer (mhTMC) had an unexpected improvement in salt passage (SP) for membranes prepared with increasing quantities of the acid-containing monomer.

TABLE 3

| Sample | mPD (wt %) | TMC (wt %) | TBP (stoich) | mhTMC (wt %) | Mean (Avg Flux) GFD | Mean (Avg SP) | Std Dev (Avg Flux) | Std Dev (Avg SP) |
|---|---|---|---|---|---|---|---|---|
| 3-1a | 3.5 | 0.26 | 1.1 | 0 | 21.4 | 0.80% | 0.82 | 0.09 |
| *3-1b | 3.5 | 0.26 | 1.1 | 0 | 26.3 | 1.33% | 0.46 | 0.07 |
| 3-1c | 3.5 | 0.24 | 1.1 | 0.03 | 22.3 | 0.53% | 0.60 | 0.16 |
| *3-1d | 3.5 | 0.24 | 1.1 | 0.03 | 29.4 | 0.79% | 0.11 | 0.06 |
| 3-1e | 3.5 | 0.21 | 1.1 | 0.05 | 21.6 | 0.48% | 0.57 | 0.01 |
| *3-1f | 3.5 | 0.21 | 1.1 | 0.05 | 28.8 | 0.57% | 0.88 | 0.06 |
| 3-1g | 3.5 | 0.16 | 1.1 | 0.10 | 23.9 | 0.51% | 0.57 | 0.12 |
| *3-1h | 3.5 | 0.16 | 1.1 | 0.10 | 29.6 | 0.45% | 0.50 | 0.05 |
| 3-1i | 3.5 | 0.12 | 1.1 | 0.14 | 26.3 | 1.11% | 0.11 | 0.03 |
| *3-1j | 3.5 | 0.12 | 1.1 | 0.14 | 29.7 | 0.46% | 1.06 | 0.00 |
| 3-2a | 3 | 0.26 | 1.5 | 0 | 24.5 | 0.70% | 1.07 | 0.11 |
| *3-2b | 3 | 0.26 | 1.5 | 0 | 33.9 | 1.11% | 2.60 | 0.29 |
| 3-2c | 3 | 0.24 | 1.5 | 0.03 | 26.3 | 0.46% | 0.83 | 0.01 |
| *3-2d | 3 | 0.24 | 1.5 | 0.03 | 35.1 | 0.61% | 0.55 | 0.12 |
| 3-2e | 3 | 0.21 | 1.5 | 0.05 | 24.6 | 0.52% | 1.59 | 0.12 |
| *3-2f | 3 | 0.21 | 1.5 | 0.05 | 31.8 | 0.35% | 1.27 | 0.03 |
| 3-2g | 3 | 0.13 | 1.5 | 0.13 | 27.2 | 4.27% | 4.79 | 1.03 |
| *3-2h | 3 | 0.13 | 1.5 | 0.13 | 25.6 | 0.88% | 0.98 | 0.07 |
| 3-3a | 2.5 | 0.26 | 1.5 | 0 | 25.8 | 1.76% | 4.02 | 0.24 |
| *3-3b | 2.5 | 0.26 | 1.5 | 0 | 31.9 | 1.81% | 2.14 | 0.08 |
| 3-3c | 2.5 | 0.24 | 1.5 | 0.03 | 27.8 | 0.58% | 0.75 | 0.12 |
| *3-3d | 2.5 | 0.24 | 1.5 | 0.03 | 32.0 | 0.83% | 0.56 | 0.11 |
| 3-3e | 2.5 | 0.21 | 1.5 | 0.05 | 26.5 | 0.72% | 4.11 | 0.17 |
| *3-3f | 2.5 | 0.21 | 1.5 | 0.05 | 33.1 | 0.63% | 1.84 | 0.03 |

TABLE 3-continued

| Sample | mPD (wt %) | TMC (wt %) | TBP (stoich) | mhTMC (wt %) | Mean (Avg Flux) GFD | Mean (Avg SP) | Std Dev (Avg Flux) | Std Dev (Avg SP) |
|---|---|---|---|---|---|---|---|---|
| 3-3g | 2.5 | 0.13 | 1.5 | 0.13 | 29.5 | 5.97% | 4.97 | 1.98 |
| *3-3h | 2.5 | 0.13 | 1.5 | 0.13 | 22.9 | 1.29% | 1.55 | 0.05 |

Example 4

In order to further illustrate the effect of preparing composite polyamide membranes with both a tri-hydrocarbyl compound and increasing quantities of an acid-containing monomer, (3-(chlorocarboynyl)benzoic acid, i.e. "mono hydrolyzed isophthaloyl chloride" or "mhIPC") along with post-treatment with nitrous acid, a series of membranes were prepared using various quantities of mPD and TMC, with TBP and mhIPC. Samples subjected to post-treatment with nitrous acid are designed with an asterisk (*). As shown by the test results summarized in Table 4, post-treatment of samples including a tri-hydrocarbyl compound (TBP) and an acid-containing monomer (mhIPC) showed improved flux along with improved salt passage (SP) for membranes including increasing quantities of carboxylic acid functionality (i.e. due to incorporation of the acid-containing monomer).

Example 5

In order to illustrate the effect of preparing composite polyamide membranes with both a tri-hydrocarbyl compound and increasing quantities of an acid-containing monomer, 6-chloro-6-oxohexaoic acid, ("mono hydrolyzed adipoyl chloride" or mh adipoyl chloride) along with post-treatment with nitrous acid, a series of membranes were prepared using various quantities of mPD and TMC, with TBP and mh adipoyl chloride. Samples subjected to post-treatment with nitrous acid are designed with an asterisk (*). As shown by the test results summarized in Table 5, post-treatment of samples including a tri-hydrocarbyl compound (TBP) and an acid-containing monomer (mh adipoyl chloride) showed improved flux

TABLE 5

| Sample | mPD (wt %) | TMC (wt %) | mh adipoyl chloride (wt %) | TBP | Mean (Avg Flux) GFD | Mean (Avg SP) | Std Dev (Avg Flux) | Std Dev (Avg SP) |
|---|---|---|---|---|---|---|---|---|
| 5-1a | 3.5 | 0.26 | 0 | 1.3 | 42 | 0.99% | 1.87 | 0.17% |
| 5-1b* | | | | | 50.2 | 1.30% | 2.56 | 0.17% |
| 5-2a | 3.5 | 0.26 | 0.01 | 1.3 | 40.4 | 0.81% | 0.37 | 0.05% |
| 5-2b* | | | | | 49.1 | 0.99% | 2.58 | 0.01% |
| 5-3a | 3.5 | 0.25 | 0.01 | 1.3 | 40.3 | 0.71% | 1.36 | 0.07% |
| 5-3b* | | | | | 49.3 | 0.79% | 0.44 | 0.02% |
| 5-4a | 3.5 | 0.25 | 0.03 | 1.3 | 39.9 | 0.62% | 0.16 | 0.03% |
| 5-4b* | | | | | 49.1 | 0.74% | 1.18 | 0.04% |
| 5-5a | 3.5 | 0.24 | 0.04 | 1.3 | 39.7 | 0.57% | 1.15 | 0.04% |
| 5-5b* | | | | | 51.6 | 0.90% | 2.32 | 0.05% |
| 5-6a | 3.5 | 0.23 | 0.05 | 1.3 | 35.2 | 0.55% | 1.88 | 0.03% |
| 5-6b* | | | | | 42.1 | 0.76% | 0.77 | 0.08% |
| 5-7a | 3.5 | 0.23 | 0.06 | 1.3 | 39.1 | 0.67% | 0.44 | 0.04% |
| 5-7b* | | | | | 48.1 | 0.89% | 1.13 | 0.06% |

TABLE 4

| Sample | mPD (wt %) | TMC (wt %) | mhIPC (wt %) | TBP (stoich) | Mean (Avg Flux) GFD | Mean (Avg SP) | Std Dev (Avg Flux) | Std Dev (Avg SP) |
|---|---|---|---|---|---|---|---|---|
| 4-1a | 3.5 | 0.26 | 0.00 | 1.3 | 46.9 | 0.76% | 2.4 | 0.04% |
| 4-1b* | | | | | 55.3 | 1.21% | 3.39 | 0.12% |
| 4-2a | 3.5 | 0.26 | 0.01 | 1.3 | 45.6 | 0.58% | 1.11 | 0.02% |
| 4-2b* | | | | | 48 | 0.93% | 0.82 | 0.03% |
| 4-3a | 3.5 | 0.25 | 0.01 | 1.3 | 43.2 | 0.53% | 2.59 | 0.02% |
| 4-3b* | | | | | 49.3 | 0.72% | 0.22 | 0.06% |
| 4-4a | 3.5 | 0.25 | 0.03 | 1.3 | 43.2 | 0.52% | 4.73 | 0.07% |
| 4-4b* | | | | | 48.7 | 0.68% | 2.02 | 0.07% |
| 4-5a | 3.5 | 0.24 | 0.04 | 1.3 | 41.6 | 0.63% | 1.89 | 0.10% |
| 4-5b* | | | | | 45.9 | 0.53% | 2.63 | 0.02% |
| 4-6a | 3.5 | 0.22 | 0.08 | 1.3 | 41.8 | 1.57% | 0.69 | 0.18% |
| 4-6b* | | | | | 46.1 | 0.99% | 1.24 | 0.09% |

Example 6

To illustrate the effect of preparing membranes with combinations of acid-containing monomers (mh-TMC) and tri-hydrocarbyl phosphate compounds (TBP) soaked in a polyfunctional arene compounds ("Arene") prior to "post treatment" with nitrous acid, a series of sample membranes were prepared and tested. Designated samples were pre-soaked in solutions containing 500 ppm of various polyfunctional arene compounds ("Arene") for approximately 15 minutes prior to post-treatment with NaNO$_2$ and HCl and then were stored in pH 9 water until testing. Arene[1] was amino salicylic acid. Arene[2] was diamino benzoic acid. Arene[3] was salicylic acid. Arene[4] was mPD. Testing was conducted using an aqueous solution containing 2000 ppm NaCl and 5 ppm boron at room temperature and 150 psi.

TABLE 6-1

| Sample | Composition | Mean Avg. Flux(GFD) (Std Dev) | Mean Avg. SP (Std Dev) | Mean Avg. A-value(GFD/psi) (Std Dev) | Mean Avg. B-value(psi) (Std Dev) |
|---|---|---|---|---|---|
| 6-1 | Control | 8.0 (0.13) | 2.33% (0.22) | 0.06 (0.001) | 0.19 (0.015) |
| 6-2 | Post-treated Control | 7.4 (0.09) | 2.38% (0.35) | 0.06 (0.001) | 0.18 (0.026) |
| 6-3 | Post-treated Control with Arene[1] | 5.3 (0.16) | 0.72% (0.03) | 0.04 (0.001) | 0.04 (0.002) |
| 6-4 | Control w/TBP | 50.7 (0.39) | 1.38% (0.41) | 0.40 (0.004) | 0.71 (0.207) |
| 6-5 | Post-treated Control with TBP | 61.9 (1.41) | 1.29% (0.07) | 0.49 (0.011) | 0.81 (0.059) |
| 6-6 | Post-treated Control with TBP & Arene[1] | 50.9 (7.11) | 0.45% (0.04) | 0.40 (0.056) | 0.23 (0.038) |
| 6-7 | Control with TBP & mh-TMC | 62.6 (9.56) | 0.59% (0.06) | 0.50 (0.075) | 0.37 (0.016) |
| 6-8 | Post-treated Control with TBP & mh-TMC | 66.9 (2.19) | 0.82% (0.07) | 0.53 (0.017) | 0.55 (0.057) |
| 6-9 | Post-treated Control w/ TBP, mh-TMC & Arene[1] | 58.1 (7.97) | 0.42% (0.05) | 0.46 (0.063) | 0.24 (0.025) |

TABLE 6-2

| Sample | Composition | Mean Avg. Flux(GFD) (Std. Dev.) | Mean Avg. SP (Std. Dev.) | Mean Avg. A-value(GFD/psi) (Std. Dev.) | Mean Avg. B-value(psi) (Std. Dev.) |
|---|---|---|---|---|---|
| 6-10 | Control with TBP | 41.0 (2.65) | 0.70% 0.05 | 0.32 0.021 | 0.29 0.026 |
| 6-11 | Post-treated Control with TBP | 53.8 3.72 | 1.19% 0.20 | 0.42 0.030 | 0.64 0.076 |
| 6-12 | Post-treated Control with TBP & Arene[2] | 47.3 2.95 | 0.87% 0.09 | 0.37 0.023 | 0.41 0.015 |
| 6-13 | Control with TBP & mh-TMC | 50.3 1.73 | 0.58% 0.06 | 0.40 0.014 | 0.29 0.021 |
| 6-14 | Post-treated Control with TBP & mh-TMC | 59.0 1.22 | 0.57% 0.03 | 0.47 0.010 | 0.34 0.008 |
| 6-15 | Post-treated Control w/ TBP, mh-TMC & Arene[2] | 56.3 2.67 | 0.49% 0.02 | 0.45 0.021 | 0.28 0.009 |

TABLE 6-3

| Sample | Composition | Mean Avg. Flux(GFD) (Std. Dev.) | Mean Avg. SP (Std. Dev.) | Mean Avg. A-value(GFD/psi) (Std. Dev.) | Mean Avg. B-value(psi) (Std. Dev.) |
|---|---|---|---|---|---|
| 6-16 | Control | 17.7 0.42 | 1.18% 0.16% | 0.14 0.004 | 0.21 0.034 |
| 6-17 | Post-treated Control | 17.2 2.10 | 1.68% 0.29 | 0.14 0.016 | 0.29 0.063 |
| 6-18 | Post-treated Control with Arene[3] | 17.9 2.71 | 1.47% 0.10 | 0.14 0.021 | 0.27 0.053 |
| 6-19 | Control w/TBP | 43.2 2.45 | 1.00% 0.13 | 0.34 0.019 | 0.44 0.066 |
| 6-20 | Post-treated Control with TBP | 52.9 0.27 | 1.34% 0.12 | 0.42 0.002 | 0.72 0.064 |
| 6-21 | Post-treated Control with TBP & Arene[3] | 52.9 2.82 | 1.08% 0.09 | 0.42 0.022 | 0.58 0.077 |

TABLE 6-4

| Sample | Composition | Mean Avg. Flux(GFD) (Std. Dev.) | Mean Avg. SP (Std. Dev.) | Mean Avg. A-value(GFD/psi) (Std. Dev.) | Mean Avg. B-value(psi) (Std. Dev.) | Mean Avg. Boron SP/B-value(psi) |
|---|---|---|---|---|---|---|
| 6-22 | Control | 16.3<br>0.38 | 1.13%<br>0.05 | 0.13<br>0.003 | 0.19<br>0.006 | |
| 6-23 | Post-treated Control | 17.6<br>0.96 | 1.38%<br>0.10 | 0.14<br>0.008 | 0.25<br>0.021 | 40.30%<br>11.9 |
| 6-24 | Post-treated Control w/ Arene[4] | 13.8<br>1.71 | 0.84%<br>0.07 | 0.11<br>0.013 | 0.12<br>0.013 | 44.30%<br>11.0 |
| 6-25 | Control w/ TBP | 41.0<br>2.65 | 0.70%<br>0.05 | 0.32<br>0.021 | 0.29<br>0.026 | 36.03%<br>23.1 |
| 6-26 | Post-treated Control w/ TBP | 53.8<br>3.72 | 1.19%<br>0.20 | 0.42<br>0.076 | 0.64<br>0.076 | 45.50%<br>44.9 |
| 6-27 | Post-treated Control w/ TBP & Arene[4] | 43.7<br>0.93 | 0.68%<br>0.04 | 0.35<br>0.008 | 0.30<br>0.024 | 38.05%<br>26.8 |
| 6-28 | Control w/ TBP & mh-TMC | 50.3<br>1.73 | 0.58%<br>0.06 | 0.40<br>0.014 | 0.29<br>0.021 | 49.31%<br>49.0 |
| 6-29 | Post-treated Control w/ TBP & mh-TMC | 59.0<br>1.22 | 0.57%<br>0.03 | 0.47<br>0.010 | 0.34<br>0.008 | 51.40%<br>62.4 |
| 6-30 | Post-treated Control w/TBP, mh-TMC &Arene[4] | 48.8<br>2.52 | 0.38%<br>0.02 | 0.39<br>0.020 | 0.19<br>0.003 | 42.52%<br>36.1 |

Example 7

To illustrate the effect of preparing membranes with acid-containing monomers (mh-TMC) soaked in a polyfunctional arene compounds ("Arene") prior to "post treatment" with nitrous acid, a series of sample membranes were prepared and tested. Designated samples were pre-soaked in solutions containing 500 ppm of various polyfunctional arene compounds ("Arene") for approximately 15 minutes prior to post-treatment with NaNO$_2$ and HCl and then were stored in pH 9 water until testing. Arene[1] was amino salicylic acid. Arene[3] was salicylic acid. Arene[4] was mPD. Testing was conducted using an aqueous solution containing 2000 ppm NaCl and 5 ppm boron at room temperature and 150 psi.

TABLE 7

| Sample | Composition | Mean Avg. Flux(GFD) (Std Dev) | Mean Avg. SP (Std Dev) | Mean Avg. A-value(GFD/psi) (Std Dev) | Mean Avg. B-value(psi) (Std Dev) |
|---|---|---|---|---|---|
| 7-1 | Control | 14.6 (1.23) | 1.17% (0.12%) | 0.12 (0.009) | 0.17 (0.007) |
| 7-2 | Post-treated Control | 16.3 (1.22) | 1.70% (0.09%) | 0.13 (0.009) | 0.28 (0.007) |
| 7-3 | Post-treated Control with Arene[1] | 10.6 (1.29) | 1.15% (0.17%) | 0.08 (0.010) | 0.12 (0.006) |
| 7-4 | Post-treated Control with Arene[3] | 12.9 | 1.25% | 0.10 | 0.16 |
| 7-5 | Post-treated Control with Arene[4] | 11.3 (1.50) | 1.02% (0.20%) | 0.09 (0.012) | 0.12 (0.029) |

The invention claimed is:

1. A method for making a composite polyamide membrane comprising a porous support and a thin film polyamide layer, wherein the method comprises:

i) applying a polar solution comprising a polyfunctional amine monomer and a non-polar solution comprising a polyfunctional acyl halide monomer to a surface of a porous support and interfacially polymerizing the monomers to form a thin film polyamide layer;

ii) treating the thin film polyamide layer with a polyfunctional arene compound comprising 1 or 2 benzene rings collectively substituted with the follow four functional groups:

(a) a first functional group (w) selected from the group consisting of: —NR$_4$R$_5$ and —OH, (b) a second functional group (x) selected from the group consisting of: —NR$_4$R$_5$, —OH, —COOH, and-SO$_3$H, (c) a third functional group (y) is selected from the group consisting of: —H, —NR$_4$R$_5$, —OH, —COOH, and —SO$_3$H, (d) a fourth functional group (z) selected from the group consisting of: —H, —CH$_3$, —NR$_4$R$_5$, —OH, —COOH and —SO$_3$H, wherein: (R$_4$) and (R$_5$) are independently selected from the group consisting of: —H and hydrocarbyl groups comprising from 1 to 10 carbon atoms; and iii) exposing the thin film polyamide layer to nitrous acid;

wherein step ii) may occur before, during or after step iii) and, wherein the method is characterized by:
(A) at least one of the polar and non-polar solutions further comprises a tri-hydrocarbyl phosphate compound represented by Formula I:

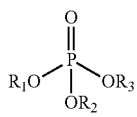

wherein $R_1$, $R_2$ and $R_3$ are independently selected from the group consisting of: hydrogen and hydrocarbyl groups comprising from 1 to 10 carbon atoms, with the proviso that no more than one of $R_1$, $R_2$ and $R_3$ are hydrogen; and
(B) the non-polar solution further comprises an acid-containing monomer comprising a $C_2$-$C_{20}$ hydrocarbon moiety substituted with at least one carboxylic acid functional group or salt thereof and at least one amine-reactive functional group selected from the group consisting of: acyl halide, sulfonyl halide and anhydride, wherein the acid-containing monomer is distinct from the polyfunctional acyl halide monomer.

2. The method of claim 1 wherein the polyfunctional arene compound is represented by at least one of:

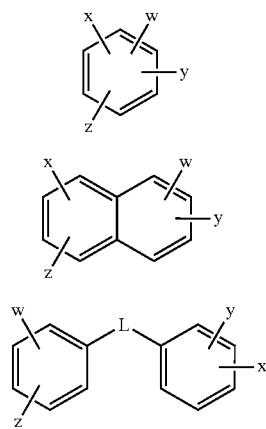

Formula (VII)

Formula (VIII)

Formula (IX)

wherein (L) is selected from the group consisting of: a bond between the rings, an alkylene group comprising from 1 to 6 carbon atoms and an oxyalkylene group comprising from 1 to 6 carbon atoms.

3. The method of claim 1 wherein the non-polar solution comprises an acid-containing monomer which comprises an arene moiety.

4. The method of claim 1 wherein the non-polar solution comprises an acid-containing monomer that comprises an aliphatic moiety.

5. The method of claim 1 wherein the non-polar solution comprises an acid-containing monomer that comprises at least two amine-reactive functional groups.

6. The method of claim 1 wherein the thin film polyamide layer has a dissociated carboxylic acid content of at least 0.18 moles/kg at pH 9.5 as measured by Rutherford Backscattering prior to the step of exposing the thin film polyamide layer to nitrous acid.

7. The method of claim 1 wherein:
(w) is selected from the group consisting of: —$NR_4R_5$ and —OH,
(x) is selected from the group consisting of: —COOH and —$SO_3H$,
(y) is selected from the group consisting of: —H, —COOH and —$SO_3H$,
(z) is selected from the group consisting of: —H, —$CH_3$, —COOH, and —$SO_3H$, and
($R_4$) and ($R_5$) are independently selected from the group consisting of: —H and hydrocarbyl groups comprising from 1 to 10 carbon atoms.

8. The method of claim 1 wherein:
(w) is selected from the group consisting of: —$NR_4R_5$,
(x) is selected from the group consisting of: —OH,
(y) selected from the group consisting of: —H, —COOH, and —$SO_3H$,
(z) selected from the group consisting of: —H, —$CH_3$, —COOH, and —$SO_3H$, and
($R_4$) and ($R_5$) are independently selected from the group consisting of: —H and hydrocarbyl groups comprising from 1 to 10 carbon atoms.

9. The method of claim 1 wherein:
(w) and (x) are selected from the group consisting of: —$NR_4R_5$,
(y) and (z) are selected from the group consisting of: —H, and
($R_4$) and ($R_5$) are independently selected from the group consisting of: —H and hydrocarbyl groups comprising from 1 to 10 carbon atoms.

* * * * *